United States Patent [19]
Sjoberg et al.

[11] 3,809,938
[45] May 7, 1974

[54] STATOR FOR A DIRECT CURRENT MACHINE

[75] Inventors: Sven Sjoberg; Herlov Fagerstad; August Weng, all of Vasteras, Sweden

[73] Assignee: Allmanna Svenska Elektriska Aktiebolaget, Vasteras, Sweden

[22] Filed: June 28, 1973

[21] Appl. No.: 374,377

[30] Foreign Application Priority Data
Aug. 11, 1972 Sweden.............................. 10423/72

[52] U.S. Cl................. 310/254, 310/217, 310/218, 29/596, 29/609
[51] Int. Cl. ........................................... H02k 1/12
[58] Field of Search .......... 310/254, 217, 218, 558, 310/89, 112; 29/596, 609

[56] References Cited
UNITED STATES PATENTS
485,220  11/1892  Pepper, Jr............................ 310/258
2,479,330  8/1949  Fagley.................................... 29/609
3,343,013  9/1967  Wightman et al. .................. 310/254

Primary Examiner—J. D. Miller
Assistant Examiner—Patrick Salce

[57] ABSTRACT

A stator for a direct current machine includes a laminated stator ring with four salient poles. There are a plurality of layers of lamination arranged side by side. Each layer is formed of four substantially L-shaped magnetic sheet-metal segments. Each segment has an external indentation at its corner, in which fit four longitudinal beams. Four pairs of cross beams are welded to the longitudinal beams and are directed perpendicularly thereto, with each pair positioned in the planes of the resulting rectangular frame. The stator ring is clamped in the stator support between the two rectangular frames formed by the cross beams. The ends of the longitudinal beams extend beyond the frames and support bearing shields which form spaces for a commutator and a ventilator.

3 Claims, 4 Drawing Figures

STATOR FOR A DIRECT CURRENT MACHINE

BACKGROUND OF THE INVENTION

Field of the Invention

The present invention relates to a stator for a direct current machine comprising a laminated stator ring provided with four salient poles.

SUMMARY OF THE INVENTION

A stator according to the invention is particularly intended to be included in direct current machines, more specifically direct current machines the rated power of which is above 20 kW. The stator is very simple from the manufacturing point of view since, to a great extent, it makes it possible to avoid parts requiring turning, above all the expensive stator ring, and it also makes it possible to avoid providing the sheet metal pocket itself with a welding seam and therefore the necessary welding volume becomes small. Further, transverse beams are used for keeping the laminated stator ring together instead of conventional press rings. The shape of the stator also causes the quality of passive material to be small in relation to the active material, which results in a low cost of material.

One further advantage of a machine provided with a stator according to the invention is that it becomes easily accessible for inspection and revision.

A stator according to the invention is characterised by the fact that the laminated stator ring with four salient poles is formed of a plurality of layers of lamination arranged side by side. Each layer is formed on four substantially L-shaped magnetic sheet-metal segments, each segment having an indentation at its corner, the indentations forming grooves or slots in each of which a longitudinal beam is arranged. Four pairs of cross beams are welded to the longitudinal beams and are positioned on opposite sides of the laminations. The longitudinal beams extend beyond the cross beams and carry at their ends bearing shields which form spaces for a commutator and a ventilator.

BRIEF DESCRIPTION OF THE DRAWINGS

The invention will be described in the following with reference to the accompanying drawing, in which.

DESCRIPTION OF THE PREFERRED EMBODIMENTS

Figure 1:
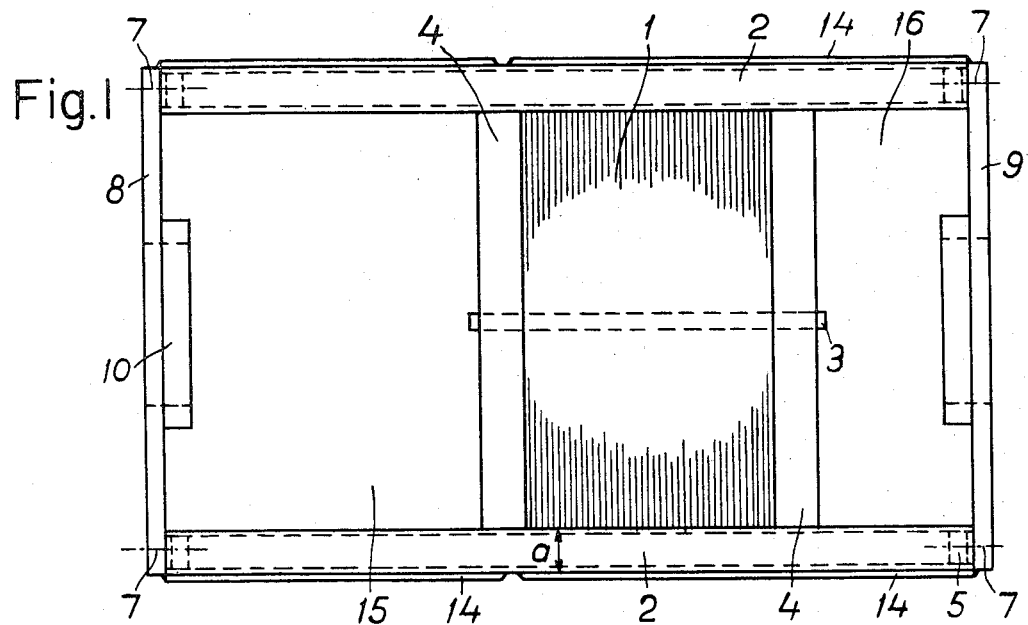
FIG. 1 shows a stator according to the invention in a view from above, upper cover panels being removed, and FIG. 2 an end view of a stator.
Figure 2:
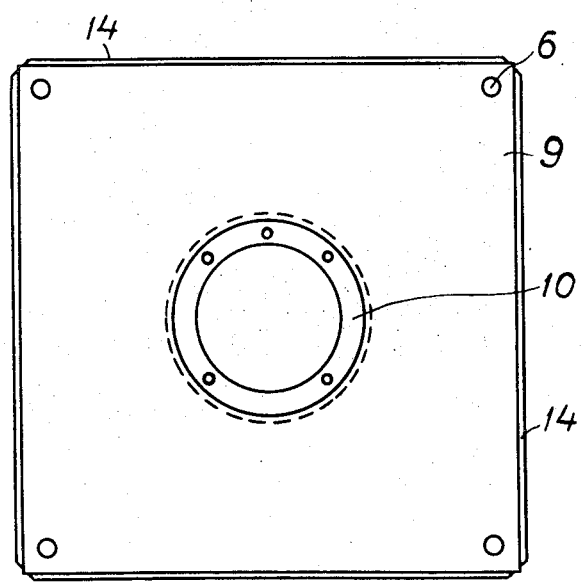
Figure 3:
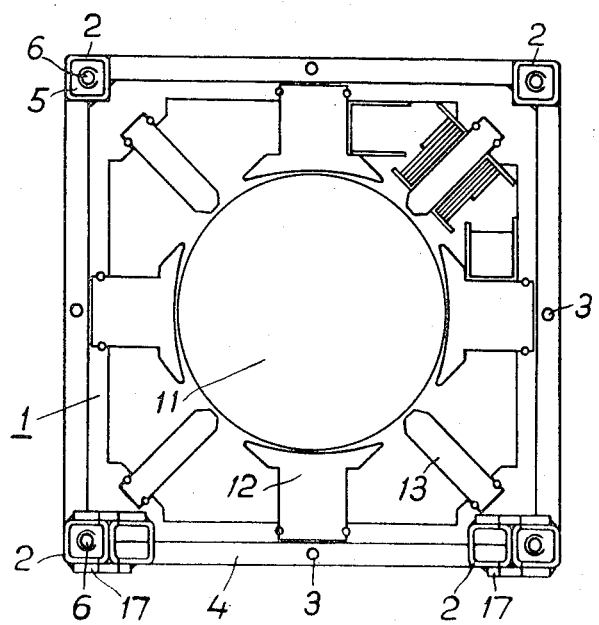
FIG. 3 shows a cross-section of a direct current machine provided with a stator according to the invention.
Figure 4:
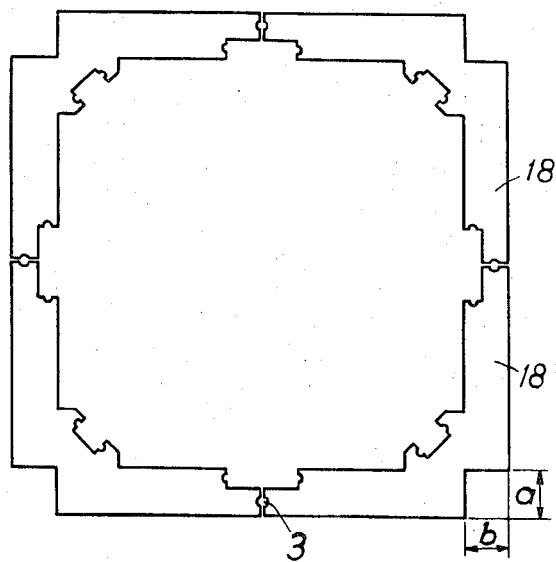
FIG. 4 shows the stator core in detail.

In the drawings, 1 designates a stator ring constructed from several layers of lamination, each layer containing four substantially L-shaped segments 18, which are held together to some extent with the help of control pins 3. Furthermore, transverse, external slots are used in the sheet metal packet, said slots being intended for transverse beams and being achieved by the fact that all L-shaped segments are punched out with an external concave core section, the angular sides of which have lengths $a$ and $b$ which are equal to the side of the cross-section of a transverse beam 2 making contact with such core sections. The beams 2 are welded together with cross beams 4. The laminated stator ring 1 is held together by the fact that its segments are clamped in between the transverse beams 4.

The beams 2 and 4 may be made in solid material or, as shown in the drawing, of rectangular tube material. In the latter case, a block 5 is welded to the end of each tube and provided with a threaded hole 6. The holes 6 are intended for screw bolts indicated by dots and dashes 7 in FIG. 1.

Bearing shields 8 and 9 are arranged at the ends of the beams 2 and fixed to these beams by means of the above-mentioned screws. The bearing shield contains a seat 10 for bearings intended to support the shaft pins of a rotor 11 surrounded by the stator.

The stator ring 1 supports the main poles 12 and the commutation poles 13. The panels 14 are screwed to the beams 2 and 4 thus forming a space 16 for a commutator and a space 16 for an inner fan. The feet of the machine consist of plates 17 which are welded to the beams 2.

We claim:

1. A stator for a direct current machine comprising a laminated stator ring provided with four salient poles, said stator ring (1) comprising several layers of lamination arranged axially one after the other, each layer comprising four substantially L-shaped magnetic sheet-metal segments (18), each segment having an external indentation at its corner, the segments being arranged in such a way that the outer side surfaces of the stator ring are substantially in four planes oriented perpendicularly to each other, said indentations forming four axially running slots, a longitudinal beam in each slot, four pairs of cross beams (4), welded to said longitudinal beam, oriented perpendicularly in relation to said longitudinal beams with each pair positioned in one of said planes, said laminated stator ring being axially clamped in the stator support between the two rectangular frames formed by said cross beams, the ends of said longitudinal beams, running axially outside said frames, supporting bearing shields, (9, 10) and, together with detachable panel plates, (14) forming spaces (15, 16) for a commutator and a ventilator.

2. A stator according to claim 1, in which said longitudinal beams have a rectangular cross-section of the same shape as said indentations.

3. A stator according to claim 1, in which two of said longitudinal beams are provided with plates secured thereto which form feet for attaching the machine to a machine base.

* * * * *